Oct. 9, 1951   J. J. WITTMAN   2,570,416
PISTON REGROOVING TOOL
Filed April 17, 1946
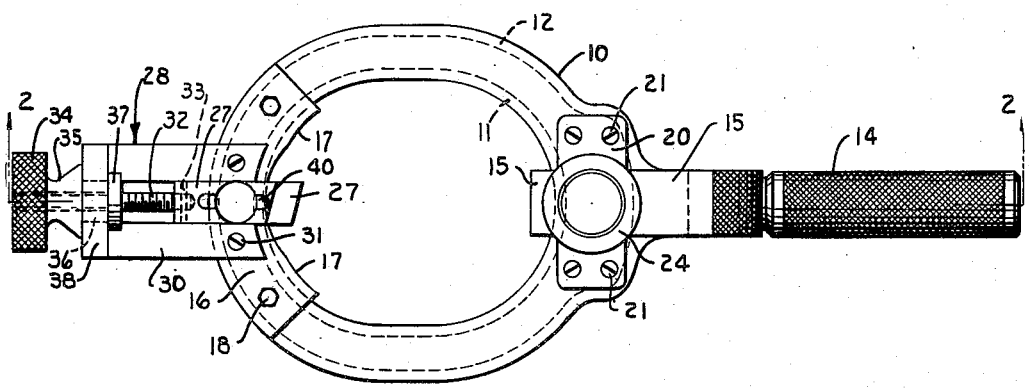
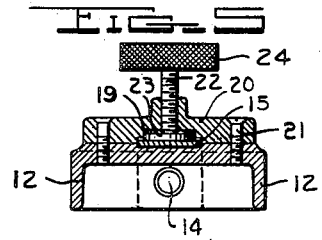
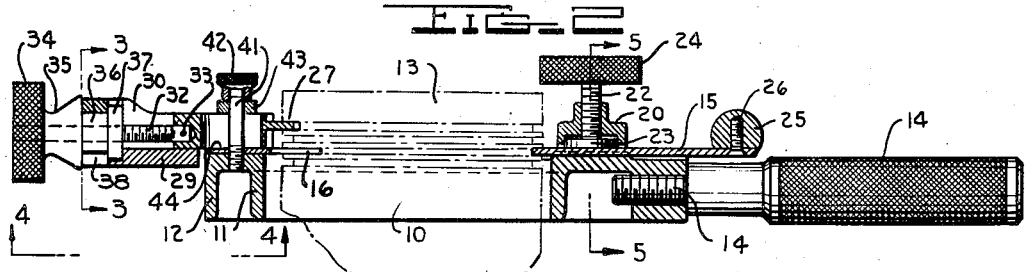
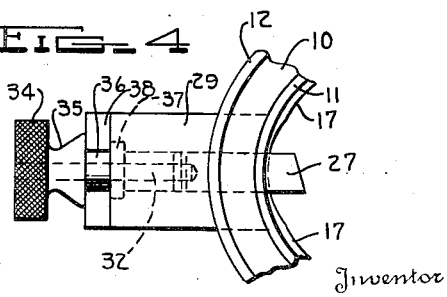
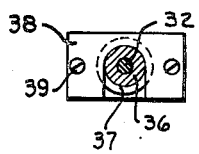
Inventor
JOSEPH J. WITTMAN
By Arthur M. Smith
Attorney

UNITED STATES PATENT OFFICE 2,570,416

PISTON REGROOVING TOOL

Joseph J. Wittman, Detroit, Mich.

Application April 17, 1946, Serial No. 662,736

1 Claim. (Cl. 82—4)

The present invention relates to a tool adapted for chamfering and similar work on pistons and similar members and is particularly adapted for use as a hand tool by automotive mechanics for regrooving pistons.

It is well known that the surface of a piston ring groove nearest the head of the piston and especially of the top groove becomes worn with use and allows oil to leak past the piston ring. Present equipment available for the high precision truing of piston grooves is expensive and requires the piston head to be disassembled from the piston rod in order to turn the piston head in a lathe or turning machine while the groove is recut. Consequently only large centrally located machine shops are equipped to do this work and considerable expense and delay is involved shipping pistons to regrooving shops from outlying districts.

Accordingly a principal object of the present invention is to provide a relatively simple and inexpensive hand tool that can be used by garage mechanics to regroove pistons without disassembling the piston from the connecting rod and without the necessity of a lathe to turn the piston.

Further objects of the present invention are to provide a regrooving tool of the character described that can be quickly adjusted to slip over the piston and which has readily adjustable guide means to insure proper formation and spacing of the recut groove.

Other objects of this invention will appear in the following description and appended claim, reference being had to the accompanying drawings forming a part of this specification wherein like reference characters designate corresponding parts in the several views.

Fig. 1 is a top view of a piston regrooving tool embodying the present invention.

Fig. 2 is a section view taken in the direction of the arrows essentially along the line 2—2 of Fig. 1 and is shown in relation to a piston.

Fig. 3 is a section view taken in the direction of the arrows along the line 3—3 of Fig. 2.

Fig. 4 is a bottom view of a portion of the tool shown in Fig. 2 and is taken in the direction of the arrows along the line 4—4.

Fig. 5 is a section view taken in the direction of the arrows along the line 5—5 of Fig. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawing, Fig. 1 shows a piston regrooving tool embodying the present invention wherein a work receiving frame 10 is formed of a slightly elongated annular casting having the downward extending sides 11 and 12, Fig. 4. The sides 11 and 12 give the annulus an essentially U-shaped cross-section, thereby providing a maximum rigidity with a minimum weight. The frame 10 is adapted to fit over the workpiece being regrooved, such as an automobile piston 13, Fig. 2, with the sides 11 making firm guiding contact with the lands of the piston 13 at opposite ends of the small diameter of said frame 10.

The rearward portion of the frame 10 is adapted to receive the knurled handle 14 which has the threaded stud-end solidly screwed into said frame 10 as shown, Fig. 2.

At opposite ends of the long axis of the frame 10 are the rear guide means 15 and forward guide plate 16. The latter has the two arcuate piston contacting surfaces 17 projecting slightly into the enclosure of the frame 10 and is rigidly secured to said frame 10 by the plurality of bolts 18.

The rearward guide 15 is securely held in place by a screw press arrangement which comprises the vertical screw member 22 having the pad 23 at the lower end thereof and being threaded through the upper portion of the yoke 20, which latter is secured to the frame 10 by the plurality of screws 21. The knurled knob 24 at the upper end of the vertical screw member 22 tightens or loosens the contact between the pad 23 and the rear guard 15 and accordingly either locks the rearguard 15 by friction contact against movement or allows sliding adjustment thereof within the slot 19 of the yoke 20. To facilitate adjustment, the knob 25 is attached to the guide 15 by the screw 26.

The cutting tool 27 is supported in the guide frame which is shown generally in Fig. 1 by the arrow 28. The body portion of the guide frame 28 has essentially a rectangular U-shaped cross-section formed by the flat base 29 and two vertical and parallel side pieces 30. An extension from each side piece 30 is secured to the frame 10 by the screws 31.

The cutting tool 27 is moved in and out between the two parallel sides 30 and on the flat base 29 by the worm gear 32 which fits into a socket at the butt of the cutting tool 27 and is secured thereto by the pin 33 extending transversely through both the worm gear 32 and the butt of the cutting tool 27. The worm gear 32 extends between the two parallel side pieces 30 and through the threaded axial opening of a worm driving member which latter comprises in one piece the knurled head 34, the neck 35, the shaft 36, and the annular retaining flange 37. The worm driving member is held in place by the slotted collar 38 which fits over the shaft 36 between the neck 35 and retaining flange 37 and which is secured to each of the side pieces 30 by the screws 39, Fig. 3. Portions of the base 29 and side pieces 30 adjacent to the collar 38 are cut away to provide a journal and a support for the retaining flange 37. Rotation of the knob 34 drives the worm gear 32 in or out along the threaded axial opening of the worm driving member. Movement of the cutting tool 27 with the worm gear 32 is allowed by the vertical slot 40 provided in the body portion of said cutting tool 27 for the vertical clamp screw 41 which screws into the frame 10. The screw 41 is tightened by its knurled head 42 and presses the washer 43 against the top surface of the body of the cutting tool 27 to clamp said tool 27 firmly in place.

It is usually the case in automobile pistons having four piston rings that only the top compression ring groove requires regrooving, but that the bottom-most oil ring receives too much wear to be satisfactorily used as a guide ring. Consequently I have adapted my invention to be guided from the second ring from the bottom, thus leaving a blank ring between the cutting tool 27 and the guides 15 and 16 in the case of four-ring pistons. This choice is arbitrary and may be varied to suit particular requirements.

In pistons of similar design but for different automobiles, the spacing between the top ring groove which requires retruing and the third from top ring groove which I prefer to use as a guide ring varies in the neighborhood of fifty-thousandths of an inch. In order to compensate for this variation and to adapt the regrooving tool embodying the present invention to pistons of slightly different measurements, the cutting tool 27 is adjusted vertically by means of a plurality of shims 44 which are selectively inserted between the cutting tool 27 and the flat base 29 of the cutting tool guide frame 28. The shims 44 essentially fill the flat bottom of the U-shaped trough of the frame guide 28 and are slotted similarly to the cutting tool 27 to provide for the vertical clamp screw 41.

In operation the forward guide plates 16 and guide frame 28 are first removed to allow the work receiving frame 10 to slip over the head of the piston 13 to be regrooved. Then the guide plate 16 is fitted on the frame 10 in the proper guide groove and is securely bolted in place. The rear guide 15 is also adjusted to fit snugly within the guide groove of the piston 13 and to press the curved sides thereof firmly against the arcuate surfaces 17 of the forward guide plate 16. Thus the piston 13 is firmly held between the sides 11 of the frame 10 and the guides 15 and 16.

The guide frame 28 for the cutting tool 27 is next assembled on the work receiving frame 10 and the spacing between the guides 15 and 16 and the cutting tool 27 is adjusted by the proper selection of shims 44 such that while the guides 15 and 16 ride on the bottom wall of the guide groove of the piston 13, the cutting tool 27 will be at the proper level to true the groove requiring regrooving. The tool 27 is then adjusted to the desired cutting depth within the groove to be regrooved by turning the knurled knob 34. Finally the tool 27 is clamped in place by tightening the knob 42, and the device is ready for operation which simply requires rotating the entire tool around the piston 13 by means of the handle 14.

The cutting tool 27 is adapted to be just slightly over size so as to retrue the groove being regrooved. With each revolution of the regrooving tool about the piston 13, the cutting depth of the tool 27 is readjusted by turning the knurled knob 34 of the worm driving member until finally the retrued groove is cut to the desired depth. It is not necessary to disassemble the piston 13 from its connecting rod to perform the operation of regrooving. The piston 13 need only be securely held in a vice or otherwise be prevented from rotating with the regrooving tool.

I have found that the two guides 15 and 16 riding on the bottom wall of the guide groove of the piston 13 insures proper spacing of the cutting tool 27 which is thus guided to true a groove within high precision measurements. The provision to adjust the guides 15 and 16 and the cutting tool 27 relative to each other also permits the use of a one-piece casting for the frame 10, thereby securing a degree of rigidity and alignment between the guides and cutting tool which is not possible in regrooving tools embodying a split ring or hinged ring in place of the work receiving frame casting 10.

I claim:

A tool for regrooving pistons comprising a substantially elliptical inverted U-shaped frame having a boss formed at one end thereof, a knurled rod forming a handle threadedly connected to said boss in alignment with the major axis of said frame, a yoke mounted on said frame inwardly of said boss and having a guide plate receiving slot also in alignment with said major axis, a relatively narrow rear guide plate supported on said frame and slidable through said guide plate slot along said major axis, a screw press clamping means on said yoke for locking said rear guide plate in a fixed position, an arcuate forward guide plate secured to said frame at the other end thereof with its inner edge extending inwardly of said frame symmetrically with respect to said major axis and in the same plane with said rear guide plate, means forming a tool way secured to said frame at its other end with said tool way extending in alignment with said major axis, said tool way comprising a base and a pair of spaced guide arms, a cutting tool slidably mounted in said tool way between said guide arms in a plane above said forward and rear guide plates, a screw means for adjustably moving said cutting tool in said tool way, and a screw press clamping means on said frame for locking said cutting tool in a fixed position.

JOSEPH J. WITTMAN.

REFERENCES CITED

The following references are of record in the file of this patent:

UNITED STATES PATENTS

| Number | Name | Date |
|---|---|---|
| 460,884 | Nugent | Oct. 6, 1891 |
| 1,820,792 | Funchess | Aug. 25, 1931 |
| 1,848,418 | Fall | Mar. 8, 1932 |
| 2,399,309 | Anderson | Apr. 30, 1946 |